United States Patent [19]

Gaussa, Jr. et al.

[11] Patent Number: 4,671,919
[45] Date of Patent: Jun. 9, 1987

[54] REACTOR POWER LEVEL MONITORING SYSTEM USING AN ALPHA-BETA TRACKER

[75] Inventors: Louis W. Gaussa, Jr., Penn Hills Township, Allegheny County; Lesley Greenberg, Monroeville, both of Pa.

[73] Assignee: Westinghouse Electric Corp., Pittsburgh, Pa.

[21] Appl. No.: 768,772

[22] Filed: Aug. 23, 1985

[51] Int. Cl.$^4$ .............................................. G21C 17/00
[52] U.S. Cl. .................................. 376/254; 376/255; 376/259
[58] Field of Search ..................... 376/254, 255, 259

[56] References Cited

U.S. PATENT DOCUMENTS

| | | | |
|---|---|---|---|
| 4,239,595 | 12/1980 | Oates et al. | 376/254 |
| 4,582,672 | 4/1986 | Tuley, Jr. et al. | 376/254 |

FOREIGN PATENT DOCUMENTS

| | | | |
|---|---|---|---|
| 0088572 | 9/1983 | European Pat. Off. | 376/259 |
| 140597 | 3/1980 | German Democratic Rep. | 376/259 |
| 52-24694 | 2/1977 | Japan | 376/259 |
| 59-190693 | 10/1984 | Japan | 376/254 |
| 60-21488 | 2/1985 | Japan | 376/254 |

OTHER PUBLICATIONS

S 05350065, 1980, pp. 1-7, IEEE, "Microprocessors in Nuclear Power Plant Protection Systems", Bruno et al.

Primary Examiner—Salvatore Cangialosi
Attorney, Agent, or Firm—Daniel C. Abeles

[57] ABSTRACT

A nuclear reactor power monitor utilizes radiation sensors, and a microprocessor implementing alpha-beta tracker equations. The use of alpha-beta tracker equations results in good noise suppression and fast follow capability. Therefore, alignment of the reactor power monitor is simplified and transients in the power level of a nuclear reactor can be detected.

7 Claims, 4 Drawing Figures

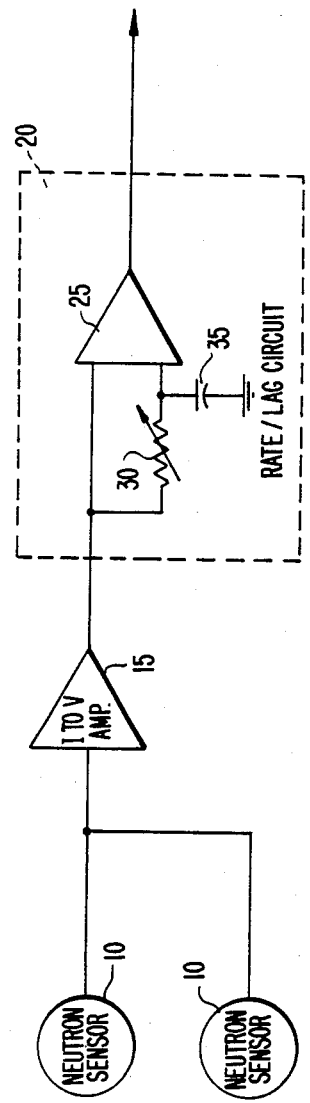
FIG. 1. *PRIOR ART*
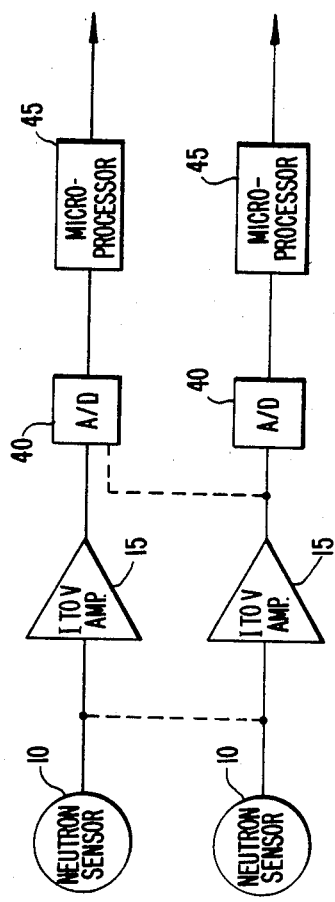
FIG. 2.

REACTOR POWER LEVEL MONITORING SYSTEM USING AN ALPHA-BETA TRACKER

BACKGROUND OF THE INVENTION

1. Field of the Invention

The present invention relates in general to power level monitors for nuclear reactors; and more particularly, to power level monitors which detect neutron emissions from a pressurized light water nuclear reactor.

2. Description of the Related Art

Several types of radiation detectors are used in the monitoring of nuclear reactors. One type detects gamma radiation from, e.g., power generation/cooling loops. Other radiation detectors sense the emission of neutrons from, e.g., the core barrel which surrounds the reactor. The neutron sensors are typically one of two types, the first type is used to detect infrequent emissions during low level operation of the reactor, such as during the start-up of the reactor in what is termed the source range. The second type of neutron sensors, for example dual uncompensated ionization chambers, such as WL-24156, manufactured by Westinghouse Industrial & Government Tube Division, detect more frequent emissions of neutrons in intermediate and power ranges.

The signals output by the second type of neutron sensors include flow induced perturbations or "nuclear noise", particularly in the power range, caused by vibration of the core barrel generated when water from the cooling loops enters the core barrel.

A prior art circuit for monitoring the power level of a nuclear reactor by detection of neutron emissions is illustrated in FIG. 1. The neutron sensors 10 are of the second type, described above, and output a current which indicates the number of neutrons detected during a sampling period. A current-to-voltage amplifier 15, such as an NM310 summing and level amplifier (part no. 3378C21), manufactured by Westinghouse Electrical Systems Division, converts the current signal to a voltage signal which is supplied to a rate/lag circuit 20, such as an NM311 power range rate circuit (part no. 3378C20), manufactured by Westinghouse Electrical Systems Division. The rate/lag circuit 20 is represented by an amplifier 25 having one input directly receiving the voltage from the current-to-voltage amplifier 15 and another input receiving the voltage signal filtered by an RC circuit comprising a variable resistor 30 and capacitor 35; however, a typical rate/lag circuit will include additional elements.

Proper adjustment or alignment of the prior art power level monitoring circuit illustrated in FIG. 1 requires the generation of known input signals, adjustment of the rate/lag circuit 20 by, e.g., changing the resistance of the variable resistor 30. Next, additional adjustments are made to circuits (not shown) which receive the output of the rate/lag circuit 20. In practice, the alignment of the rate/lag circuit 20 has been found to be quite difficult, sometimes requiring reiterative adjustment of the rate/lag circuit 20 and the following circuits. In addition, the noise filtering capability of prior art power level monitoring circuits has been limited to removing some high frequency signals. Also, the use of an RC network in the rate/lag circuit 20 results in relatively slow response for prior art power monitoring circuits, making quick detection of transients difficult.

SUMMARY OF THE INVENTION

An object of the present invention is to provide a power level monitor having noise reduction capability.

Another object of the present invention is provide a power level monitor capable of quick detection of transients in the neutron flux of a nuclear power reactor.

A further object of the present invention is to provide a power level monitor which is easily aligned.

Yet another object of the present invention is to provide a power level monitor which generates a prediction of the power level of a nuclear reactor.

The above objects are accomplished by a power level monitor including a neutron detector, a current-to-voltage amplifier, an analog/digital converter and a microprocessor. When neutrons are detected, the neutron detector outputs a signal which is amplified into an analog voltage by the current-to-voltage amplifier. The analog voltage is converted into a digital sample signal by the analog/digital converter that is supplied to the microprocessor which outputs signals indicating reactor power level, rate of change of the reactor power level and predicted reactor power level for a sampling period having a predetermined length. The signals output by the microprocessor are generated from the digital sample signal by converting the sample signal into a converted signal; multiplying the converted signal by a first constant to produce a first multiplied signal; multiplying the converted signal by a second constant divided by the length of the sampling period to produce a second multiplied signal; summing a prior rate of power level change signal produced during an immediately previous sampling period with the second multiplied signal to produce the current rate of power level change signal for the current sampling period; summing a prior power level signal produced during the immediately previous sampling period with the length of the sampling period multiplied by the prior rate of power level change signal produced during the immediately previous sampling period to produce a predicted power level signal; subtracting the predicted power level signal from the sample signal to produce the converted signal; and summing the converted and predicted power level signals to produce the current power level signal.

These objects together with other objects and advantages which will be subsequently apparent, reside in the details of construction and operation as more fully hereinafter described and claimed, reference being had to the accompanying drawings forming a part hereof, wherein like reference numerals refer to like parts throughout.

BRIEF DESCRIPTION OF THE DRAWINGS

FIG. 1 is a block diagram of a prior art power level monitoring circuit;

FIG. 2 is a block diagram of a power level monitoring circuit according to the present invention;

DESCRIPTION OF THE PREFERRED EMBODIMENTS

Figure 3A:
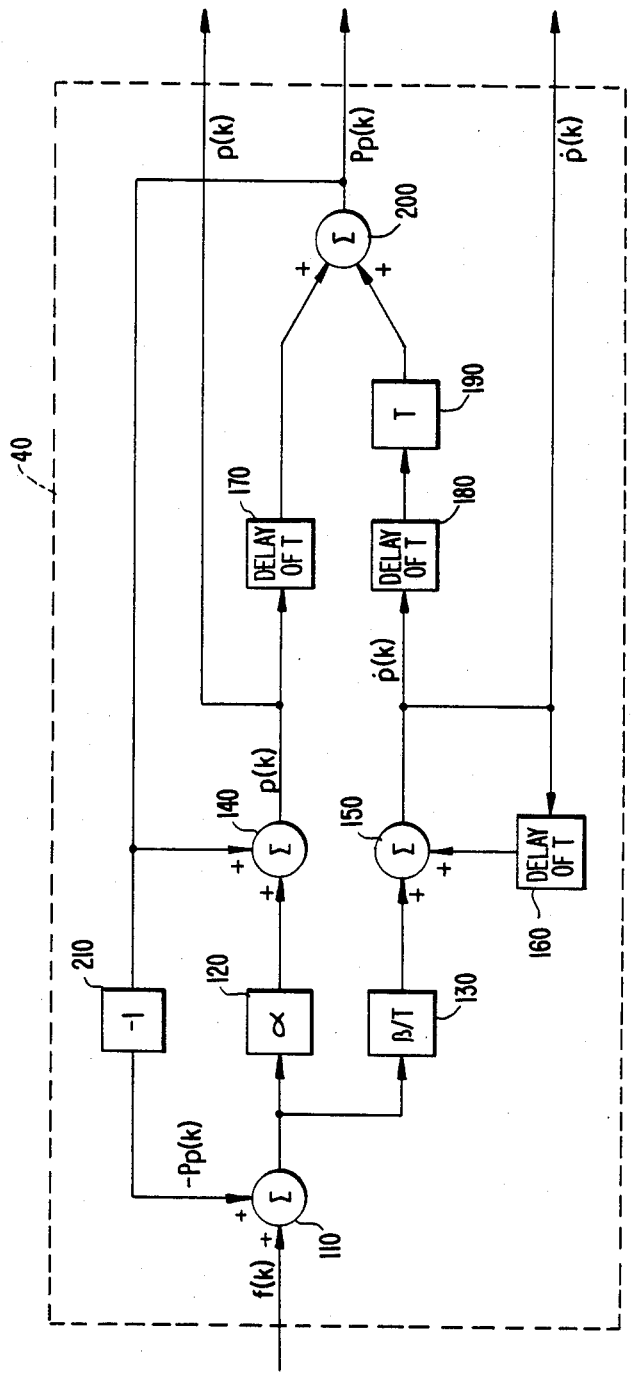
FIG. 3A is a block diagram of the calculations performed by the microprocessor in the block diagram of FIG. 2.

An embodiment of the present invention is illustrated in FIG. 2 and includes neutron sensors 10 and current-to-voltage amplifiers 15 similar to those used in the prior art circuit illustrated in Fig. 1. According to the present invention, both of the neutron sensors 10 may be connected to a single one of the current-to-voltage amplifiers 15, as indicated by the dashed line and as in the prior art circuit of FIG. 1, or each neutron sensor 10 may supply a current signal as the sole input to one of the current-to-voltage amplifiers 15. The analog voltage output by the current-to-voltage amplifiers 15 is supplied to an analog/digital converter 40 for input to a microprocessor 45. The analog/digital converter 40 and microprocessor 45 may be implemented on a single board computer such as an Intel 88/40. Depending on the particular analog/digital converter 40 and microprocessor 45 and monitoring system requirements, separate current-to-voltage amplifiers 15 may each be connected to separate analog-digital converters 40 or, as indicated by the dashed line, be connected to the same analog-digital converter on separate channels. Similarly, there may be one or more microprocessors 45 for each analog/digital converter 40.

Mere replacement of the analog circuits illustrated in FIG. 1 by the digital circuitry illustrated in FIG. 2, may simplify the alignment process and the speed with which the power level monitoring circuit responds to transients; however, there is no automatic reduction in noise. It is possible to reduce the effects of nuclear noise by proper selection of the algorithm performed by the microprocessor 45.

The selection of an algorithm is governed by several factors. First, the algorithm should be capable of reducing noise without total loss of the ability to detect transients. Secondly, power level monitoring circuits which operate in the power range of a nuclear reactor are required to supply a signal indicating rate of change of the power level, so that a "trip" can be generated when the rate of change has a magnitude above a specified value, i.e., indicating a sudden change in power, which may be a transient condition.

One algorithm which meets these requirements is defined by alpha-beta tracker equations which are commonly used in radar applications. Application of the alpha-beta tracker equations to processing in radar systems is described in J. A. Cadzow, *Discrete-Time Systems*, Prentiss-Hall, 1973, sections 2.6 (pages 63–66) and 8.11 (pages 272–278). Applying the equations described in Cadzow to the power level monitoring circuit illustrated in FIG. 2, the digital voltage output by the analog/digital converter 40 can be represented by f(k). The power level p(k), rate of change of power level ṗ(k) and predicted power level $p_p(k)$ are defined by equations (1)–(3) below.

$$p_p = p(k-1) + T\dot{p}(k-1) \tag{1}$$

$$p(k) = p_p(k) - \alpha[f(k) - p_p(k)] \tag{2}$$

$$\dot{p}(k) = \dot{p}(k-1) + \frac{\beta}{T}[f(k) - p_p(k)] \tag{3}$$

The power level p(k) is an estimate or smoothed output for the current sampling period in which the effects of noise have been reduced. The predicted power level $p_p(k)$ is a prediction of the estimated power p(k) for the immediately following sampling period. The length of the sampling period is represented by T, $\alpha$ and $\beta$ are constants which determine the dynamic response of the power level monitor.

The interrelationship of equations (1)–(3) is visually represented by the block diagram illustrated in FIG. 3. The input sample signal f(k) is converted by adder 110 and multiplied by constants $\alpha$ and $\beta/T$ in multipliers 120 and 130. The resulting signals are input to adders 140 and 150, respectively. The outputs of adders 140 and 150 are supplied to registers 160, 170 and 180 which provide a delay of T. The output of register 160 is summed with the output of multiplier 130 to provide the rate of change of the power level ṗ(k). The output of register 180 is multiplied by the length of the sampling period T in multiplier 190 prior to being summed with the output of register 170 in adder 200 to provide the predicted power level $p_p(k)$. The predicted power level $p_p(k)$ is multiplied by negative one so that it is subtracted from the sampled signal f(k) by adder 110 and is also summed with the output of multiplier 120 to produce the smoothed power level p(k).

Selection of appropriate values for the constants $\alpha$ and $\beta$ is explained in *Cadzow* in section 8.11 (pages 272–278) using the Z-transform which is 8.11 (pages 272–278) using the Z-transform which is throughly discussed on pages 144–175 of *Cadzow*. The Z-transform of equations (1)–(3) are illustrated as a block diagram in FIG. 3B and appear below as equations (4)–(6).

$$P_p(z) = z^{-1}P(z) + z^{-1}T\dot{P}(z) \tag{4}$$

$$P(z) = P_p(z) + \alpha[F(z) - P_p(z)] \tag{5}$$

$$\dot{P}(z) = z^{-1}\dot{P}(z) + \frac{\beta}{T}[F(z) - P_p(z)] \tag{6}$$

Figure 3B:
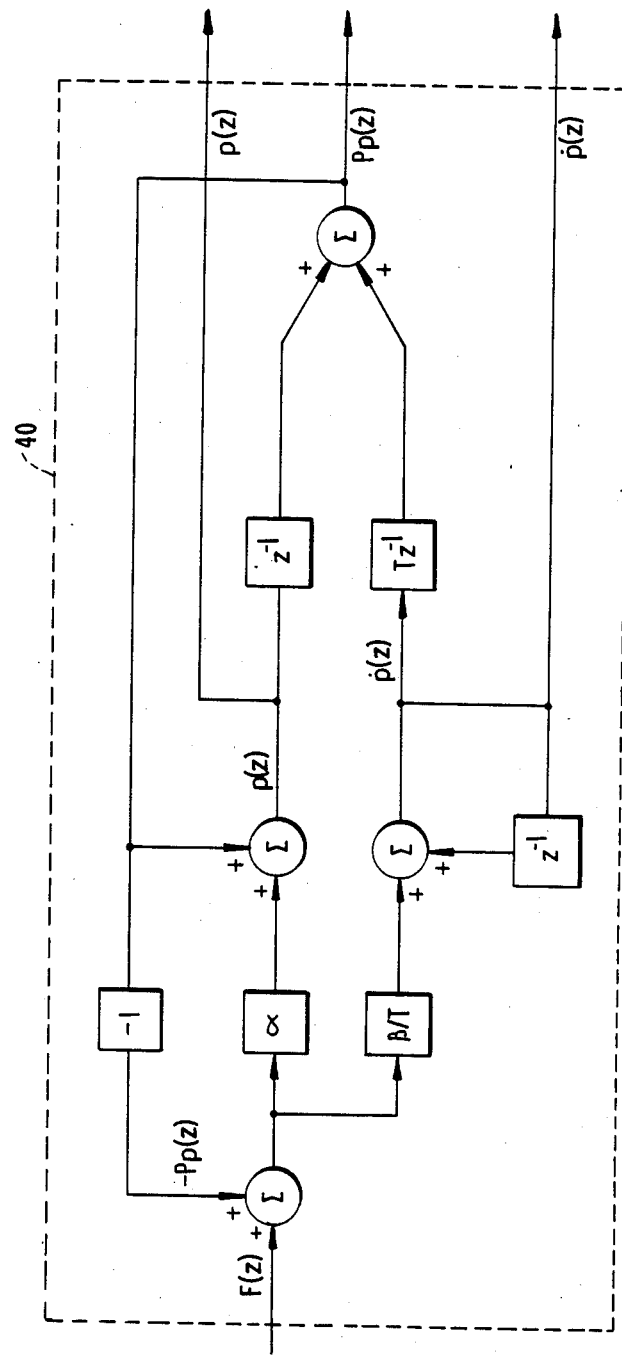
FIG. 3B is a block diagram of the Z-transform of the calculations illustrated in FIG. 3A.

Since the outputs illustrated in FIG. 3B are all derived from a single input, the following transfer functions $H_1(z)$–$H_3(z)$ can be defined.

$$P(z) = H_1(z)F(z) \tag{7}$$

$$\dot{P}(z) = H_2(z)F(z) \tag{8}$$

$$P_p(z) = H_3(z)F(z) \tag{9}$$

Dividing both sides of equations (4)–(6) by the Z-transform F(z) of the input signal f(k), incorporating the transfer function relationships of equations (7)–(9) and rearranging the terms, results in the following equations (10)–(12).

$$z^{-1}H_1(z) + z^{-1}TH_2(z) - H_3(z) = 0 \tag{10}$$

$$H_1(z) - (1-\alpha)H_3(z) = \alpha \tag{11}$$

$$(1 - z^{-1})H_2(z) + \frac{\beta}{T}H_3(z) = \frac{\beta}{T} \tag{12}$$

Solving equations (10)–(12) for $H_1(z)$–$H_3(z)$ results in the following equations (13)–(15).

$$H_1(z) = \frac{z(\alpha z + \beta - \alpha)}{z^2 + (\beta + \alpha - 2)z + 1 - \alpha} \tag{13}$$

$$H_2(z) = \frac{\beta}{T} \frac{z(z-1)}{z^2 + (\beta + \alpha - 2)z + 1 - \alpha} \tag{14}$$

$$H_3(z) = \frac{z(\alpha + \beta) - \alpha}{z^2 + (\beta + \alpha - 2)z + 1 - \alpha} \quad (15)$$

The denominator polynomial which is common to all three of the fractions above is known as the characteristic equation which defines the system poles. Solving for the poles of the characteristic equation yields equation (16) below.

$$z = \frac{2 - \alpha - \beta}{2} \pm \frac{1}{2}(\beta^2 + \alpha^2 + 2\alpha\beta - 4\beta)^{\frac{1}{2}} \quad (16)$$

Assuming a critically damped system is desired, the term $(\beta^2 + \alpha^2 + 2\alpha\beta - 4\beta)$ is set to zero with the result that $\alpha = 2\sqrt{\beta} - \beta$. Substituting for in equations (13)-(15) produces the following equations (17)-(19).

$$H_1(z) = \frac{z[(2\sqrt{\beta} - \beta)z + 2\beta - 2\sqrt{\beta}]}{(z + \sqrt{\beta} - 1)^2} \quad (17)$$

$$H_2(z) = \frac{\beta}{T} \frac{z(z - 1)}{(z + \sqrt{\beta} - 1)^2} \quad (18)$$

$$H_3(z) = \frac{2\sqrt{\beta} z + \beta - 2\sqrt{\beta}}{(z + \sqrt{\beta} - 1)^2} \quad (19)$$

Thus, a critically damped power monitor using alpha-beta tracker equations has a double pole of $z = 1 - \sqrt{\beta}$.

Implementation of an alpha-beta tracker power level monitor requires selection of a sampling period length T and a value for $\beta$, from which the value of $\alpha$ can be found. The sampling period length T will be determined by the speed of the neutron sensor 10, analog/digital converter 40, and the requirements of the equipment which receives the signals output by the microprocessor.

A discussion of how to select the value of $\beta$ can be found on page 278 of *Cadzow* and in Benedict, T. R. and Bordner, G. W., "Synthesis of an Optimal Set of Radar Track—While Scan Smoothing Equations," *IRE Transactions on Automatic Control,* Vol. AC-7, No. 4 (July, 1962) pages 27-32. The value of $\beta$ affects the degree of noise reduction and system response speed. For applications such as data logging of the neutron flux in a nuclear reactor, a value of $\beta$ equal to or very close to zero is preferable, because the effects of noise will be minimized. However, the response time will be very slow. Therefore, in neutron flux monitors which must generate trip signals, the value of $\beta$ is increased (up to a maximum of 1) until statisfactory system response time is achieved. The amount of noise suppression provided by an alpha-beta tracker is reduced as $\beta$ is increased; therefore, $\beta$ should be selected to be as small as possible while meeting the system response time requirements. Once the value of has been selected, the value of $\alpha$ can be found as $2\sqrt{\beta} - \beta$ and a program for microprocessor 45 can be easily written from the block diagram in FIG. 3A.

When implemented, a power level monitor using alpha-beta tracker equations will provide noise suppression and "fast follow" capability for responding to transients in the neutron flux. In addition, both the rate of power level change p(k) and a predicted next power level $p_p(k)$ are automatically produced by the alpha-beta tracker equations. Also, alignment of such a power level monitor is considerably simplified due to the noise suppression capabilities of the alpha-beta tracker equations and the use of digital processing which eliminates the need for adjusting a variable resistor in a rate/lag circuit 20 as in the prior art.

The many features and advantages of the present invention are apparent from the detailed specification, and thus it is intended by the appended claims to cover all such features and advantages of the power level monitor which fall within the true spirit and scope of the invention. Further, since numerous modifications and changes will readily occur to those skilled in the art, it is not desired to limit the invention to the exact construction and operation illustrated and described, accordingly, all suitable modifications and equivalents may be resorted to, falling within the scope of the invention.

What is claimed is:

1. A method of monitoring reactor power levels in a nuclear reactor, comprising the steps of:
    (a) producing a sample signal indicating radiation detected during a sampling period having a predetermined length;
    (b) converting the sample signal into a converted signal;
    (c) multiplying the converted signal by a first constant to produce a first multiplied signal;
    (d) multiplying the converted signal by a second constant divided by the length of the sampling period to produce a second multiplied signal;
    (e) converting the first and second multiplied signals into current power level and rate of power level change signals, respectively;
    (f) summing a prior rate of power level change signal produced during an immediately previous sampling period with the second multiplied signal to produce the current rate of power level change signal in step (e);
    (g) summing a prior power level signal produced during the immediately previous sampling period with the length of the sampling period multiplied by the prior rate of power level change signal produced during the immediately previous sampling period to produce a predicted power level signal;
    (h) subtracting the predicted power level signal from the sample signal to produce the converted signal in step (b);
    (i) summing the first multiplied and predicted power level signals to produce the current power level signal in step (e); and
    (j) outputting the current power level, rate of power level change and predicted power level signals.

2. A reactor power level monitor for a nuclear reactor, comprising:
    radiation sensing means for sensing radiation emitted from the nuclear reactor and outputting a sample signal indicative of the radiation sensed during a sampling period having a predetermined length; and
    microprocessing means for converting the sample signal into reactor power level, rate of reactor power level change and predicted reactor power level signals.

3. A reactor power level monitor as recited in claim 2, wherein the sample signal contains noise and said microprocessor means comprises noise reduction means for reducing the noise in said sample signal.

4. A reactor power level monitor as recited in claim 2, wherein said radiation sensing means comprises:
   neutron sensing means for sensing neutrons emitted from the pressurized light water nuclear reactor and outputting a current indicative of the neutrons sensed during the sampling period;
   current-to-voltage converting means for converting the current output by said neutron sensing means into an analog voltage; and
   analog/digital converting means for converting the analog voltage output by said current-to-voltage converting means into the sample signal.

5. A reactor power level monitor as recited in claim 2, wherein said microprocessor means comprises:
   means for converting the sample signal into a converted signal;
   means for multiplying the converted signal by a first constant to produce a first multiplied signal;
   means for multiplying the converted signal by a second constant divided by the length of the sampling period to produce a second multiplied signal;
   means for summing a prior rate of reactor power level change signal for an immediately previous sampling period with the second multiplied signal to produce the rate of reactor power level change signal for the sampling period;
   means for summing a prior reactor power level signal for the immediately previous sampling period with the length of the sampling period multiplied by the prior rate of reactor level change signal to produce the predicted reactor power level signal;
   means for subtracting the predicted reactor power level signal from the sample signal to produce the converted signal; and
   means for summing the first multiplied and predicted reactor power level signals to produce the reactor power level signal for the sampling period.

6. A method of monitoring reactor power levels in a pressurized light water nuclear reactor, comprising the steps of:
   (a) producing a sample signal f(k) indicating neutrons detected during a sampling period k having a predetermined length T;
   (b) producing a rate of power level change signal p(k) in accordance with $$\dot{p}(k) = \dot{p}(k-1) + \frac{\beta}{T}[f(k) - p_p(k)],$$

where p(k−1) is the rate of power level change during an immediately previous sampling period, $\beta$ is a constant with a value between zero and one, inclusive, and $p_p(k)$ is a predicted power level for a next sampling period;
   (c) producing a reactor power level signal p(k) in accordance with $$p(k) = p_p(k) - \alpha[f(k) - p_p(k)],$$

where $\alpha$ is a constant equal to $2\sqrt{\beta} - \beta$; and
   (d) producing the predicted power level $p_p(k)$ in accordance with $$p_p(k) = p(k-1) + T\dot{p}(k-1),$$

where p(k−1) is the power level of the immediately previous sampling period.

7. A reactor power level monitor for a pressurized light water nuclear reactor, comprising:
   neutron detecting means for detecting neutrons emitted from the pressurized light water nuclear reactor and outputting a sample signal f(k) indicative of the neutrons detected during a sampling period k having a predetermined length T;
   rate means for converting the sample signal k into a rate of power level change signal p(k) in accordance with $$\dot{p}(k) = \dot{p}(k-1) + \frac{\beta}{T}[f(k) - p_p(k)],$$

where p(k−1) is the rate of power level change for an immediately previous sampling period k−1, $\beta$ is a constant with a value between zero and one, inclusive, and $p_p(k)$ is a predicted power level for a next sampling period;
   power signal means for converting the sample signal into a reactor power level signal p(k) in accordance with $$p(k) = p_p(k) - \alpha[f(k) - p_p(k)],$$

where $\alpha$ is equal to $2\sqrt{\beta} - \beta$; and
   predicted power signal means for converting the sample signal into a predicted reactor power level signal $p_p(k)$ in accordance with $$p_p(k) = p(k-1) + T\dot{p}(k-1),$$

where p(k−1) is the power level signal for the immediately previous sampling period.

* * * * *